United States Patent Office 2,934,506
Patented Apr. 26, 1960

2,934,506

MODIFIED EPOXIDE RESINS

Darrell D. Hicks, John E. Masters, and William J. Belanger, Louisville, Ky., assignors to Devoe & Raynolds Company, Inc., a corporation of New York No Drawing. Application June 11, 1956
Serial No. 590,418

8 Claims. (Cl. 260—18)

This invention relates to novel resinous compositions. In one of its aspects the invention relates to resin compositions which are derived from epoxide compounds, or polyepoxides. In another of its aspects the invention pertains to methods for the preparation of these novel resins.

A great deal of research has been directed toward the production of epoxide resins since these substances have been found to be valuable compositions for use in the manufacture of varnishes, molding resins, adhesives, films and the like.

It is known that epoxide resins, obtained as a product of reaction of a polyhydric compound, such as a dihydric phenol, and an epihalohydrin, can be converted to thermosetting resins by the use of polycarboxylic acid anhydrides. It is known, for example, that hard thermosetting resins are obtained by condensing certain epoxide resins with phthalic acid anhydride. This invention has as an object the provision of modified polybasic acid anhydride cured epoxide resins. The invention also relates to the production of fusible, soluble resins resulting from the modification of the polybasic anhydride-epoxide reaction mixture, the modified reaction mixture being capable on heating of forming an insoluble, infusible cured resin.

Theoretically, two epoxide groups (one mol of a diepoxide) should be cured with two anhydride groups in order to obtain a maximum degree of cross-linking. However, this maximum degree of cross-linking yields a resin, the utility of which is limited by its brittleness. On the other hand, a ratio of less than 2 anhydride groups for 2 epoxide groups does not result in the greatest degree of cure. Nevertheless, it has been found that the best anhydride-epoxide cures are obtained when one anhydride group is used with 2 epoxide groups. This invention is based on the discovery that, using a glycidyl polyether having more than 1 epoxide group per molecule and having a weight per epoxide below 1000, when the reaction mixture is modified by the addition of a third ingredient, not only a high degree of cure is obtained but a resin results which does not have the high degree of brittleness. It has been found that when less than 2 anyhydride groups per mol of diepoxide are employed the cured resin contains unreacted epoxide groups which have not entered into the curing reaction. It has also been found that by the use of a modifying ingredient or agent advantage can be taken of these unreacted epoxide groups. When the reaction mixture is modified by the addition of a third ingredient, a high degree of cure is obtained through the use of previously unreacted epoxide groups, and a resin results which does not have the high degree of brittleness. In accordance with this invention resins can be made which are well cured and hard but which are sufficiently flexible to adapt themselves to a wide variety of applications, particularly in the adhesive and potting fields. Moreover, there is a definite economic advantage to preparing resins according to this invention. Since the modifiers of the invention replace part of the more expensive epoxide, the cured resin can be produced much more cheaply than the same quantity of unmodified cured resin.

In accordance with an embodiment of this invention the resins contemplated are prepared by the use as modifying agents of higher aliphatic monocarboxylic acids. In one of its embodiments the invention includes reacting a higher aliphatic monocarboxylic acid (a higher fatty acid), a glycidyl polyether containing more than one epoxide group per molecule and having a weight per epoxide below 1000, and a polybasic acid anhydride. The invention contemplates the step-wise addition of the ingredients, wherein one of the three reactants is added to the other two, or where the three reactants are combined. In fact, in one of its aspects, the higher fatty acid is reacted with a glycidyl polyether, and the resulting product is further reacted with a polybasic acid anhydride and the same or a different glycidyl polyether. In the case of a viscous glycidyl polyether it is desirable to first combine the fatty acid with one epoxide group thus preparing a partial ester of the diglycidyl polyether. This is accomplished by reacting one mol of the higher aliphatic monocarboxylic acid with one mol of the glycidyl polyether in the presence of a catalyst, for example, a catalytic quantity of an alkaline catalyst including inorganic hydroxides, amines and quaternary ammonium hydroxides. The higher fatty acid partial ester is more fluid than the glycidyl polyether itself and hence can be readily blended with varying percentages of a glycidyl polyether and cured with the polycarboxylic acid anhydride.

It is seen that the higher monocarboxylic acid and the glycidyl polyether can be reacted in situ or at least part of the monocarboxylic acid can be reacted with the glycidyl polyether prior to the addition of polybasic acid anhydride and additional glycidyl polyether. When all three reactants are combined the ingredients are normally slowly heated until a melt is obtained in order to initiate the reaction between the higher monocarboxylic acid and the glycidyl polyether. An epoxide, if pure, will not react with an anhydride. However, the reaction having been initiated by the higher fatty acid will proceed by reaction at an elevated temperature of the polybasic acid anhydride with hydroxyl radicals formed in the reaction of the higher aliphatic monocarboxylic acid with the glycidyl polyether. The reaction of the anhydride with hydroxyl groups provides additional carboxyl radicals which will react with epoxide groups to effect the formation of the resinous compositions. Thus the reaction mixture is heated until a clear solution is obtained and the resin is then cured at a temperature of from 80° C. to 180° C. Although not necessary, it is desirable to use a catalyst when the glycidyl polyether, the polybasic acid anhydride and the higher fatty acid are combined. However, if the higher fatty acid is first reacted with glycidyl polyether, the use of a catalyst is optional.

A particular advantage of this invention is that as the molecular weight of the fatty acid is increased the cured resin becomes correspondingly more flexible. This resins modified with lauric, oleic and soya acids are considerably more flexible than the unmodified resins. In general, the hardness of the cured resin decreases with increased fatty acid content. The quantities of glycidyl polyether, polybasic acid anhydride and higher monobasic acids employed in the practice of this invention are best expressed in ratios of epoxide equivalents to anhydride equivalents to mols monocarboxylic acid. The epoxide equivalent represents the weight of the product per epoxide group. The epoxide equivalent of an epoxy compound is determined by titrating a one gram sample with an excess of pyridine containing pyridine hydrochloride (made by adding 16 cc. of concentrated hydrochloric acid per liter of pyridine) at the boiling point for 20 minutes and back titrating the excess of pyridine hydrochloride with 0.1 N sodium hydroxide using phenolphthalein as an indicator and considering one HCl as equivalent to one epoxide group. The molecular weight of glycidyl polyethers is generally two times the weight per epoxide. Molecular weight determinations can, however, be made by a standard boiling point elevation method. In some cases the molecular weight values correspond to the theoretical values for a straight chain polymer. In other cases, however, a higher molecular weight value is obtained, seemingly indicating a more complex structure. An anhydride equivalent represents the weight of the acid anhydride, generally in grams, per anhydride group. Thus by two anhydride equivalents is intended two times the weight per anhydride.

In the preparation of the resinous compositions of this invention a ratio of two equivalents of glycidyl polyether to two equivalents of higher fatty acid plus polybasic acid anhydride generally is employed. Desirably the ratio is two equivalents of glycidyl polyether to 0.1 to 0.8 mol monobasic aliphatic acid to 1.9 to 1.2 equivalents of polybasic acid anhydride. In instances where the fatty acid partial ester of the glycidyl polyether is first prepared by reacting one mol of fatty acid with one mol of the glycidyl polyether, the partial ester being blended with additional percentages of glycidyl polyether and cured with polybasic acid anhydride, a convenient guide is to use one equivalent of polybasic acid anhydride for each one mol of mono-ester and one equivalent of polybasic acid anhydride for each epoxide equivalent of additional glycidyl polyether.

As noted, in the preparation of resins of this invention a saturated or unsaturated higher fatty acid is used. By higher fatty acid is meant aliphatic monocarboxylic acids having at least 8 carbon atoms. Among these are ethyl hexoic, undecynoic, erucic, nervonic, octadecynoic, 7-hexadecynoic, oleic, etc., as well as linolenic and linoleic, and tridecynoic. Unsaturated higher fatty acids include not only the acids or mixtures of acids per se, but also acids derived from the well known drying oils. Desirable fatty acids are derived from tall oil, sardine oil, dehydrated castor oil, linseed, tung, soybean, safflower, oiticica, and hemp seed, and from other minor drying oils, such as poppy seed oil, walnut oil and the like.

As indicated, this invention is applicable to glycidyl polyethers containing more than 1 epoxide group per molecule and having a weight per epoxide below 1000. Desirable glycidyl polyethers are glycidyl polyethers of polyhydric phenols or polyhydric alcohols. Such glycidyl polyethers are generally produced by the reaction of epichlorhydrin or glycerol dichlorhydrin with dihydric phenols, polyhydric phenols or polyhydric alcohols generally in the presence of a condensing agent, for example, caustic alkali.

The products resulting from the reaction of a polyhydric phenol or a polyhydric alcohol with epichlorhydrin or glycerol dichlorhydrin are monomeric and straight chain polymeric products characterized by the presence of more than 1 terminal epoxide group. Monomeric polyglycidyl polyethers include the glycidyl polyethers of polyhydric phenols obtained by reacting in an alkaline medium a polyhydric phenol with an excess, e.g., 4 to 8 mol excess, of an epihalohydrin. Thus a polyether which is substantially 2,2-bis(2,3-epoxypropoxyphenyl)-propane is obtained by reacting bisphenol 2,2-bis(4-hydroxyphenyl)propane with an excess of epichlorhydrin. Other polyhydric phenols that can be used for this purpose include resorcinol, catechol, hydroquinone, methyl resorcinol, or polynuclear phenols such as 2,2-bis(4-hydroxyphenyl)butane, 4,4'-dihydroxybenzophenone, bis(4-hydroxyphenyl)ethane and 1,5-dihydroxynaphthalene. The epihalohydrins can be further exemplified by 3-chloro-1,2-epoxybutane, 3-bromo-1,2-epoxyhexane, 3-chloro-1,2-epoxyoctane and the like.

One class of straight chain polymeric glycidyl polyethers is produced by the reaction of a polyhydric phenol such as bisphenol with epichlorhydrin or glycerol dichlorhydrin using different proportions of reactants. In the production of this class of epoxide resins the proportions of bisphenol and epichlorhydrin or glycerol dichlorhydrin vary from about 1 mol of bisphenol to 1,2 mol epichlorhydrin or glycerol dichlorhydrin to about 1 mol bisphenol to 1.5 epichlorhydrin or glycerol dichlorhydrin as set forth in U.S. Patent 2,615,007. In addition, sufficient caustic alkali is employed to combine with the chlorine atoms of the epichlorhydrin or glycerol dichlorhydrin.

Another group of polymeric glycidyl polyethers is produced by the reaction of a dihydric phenol such as bisphenol with epichlorhydrin in the proportions of about 2 mols of epichlorhydrin to about 1 mol of bisphenol and with the use of caustic alkali in amounts sufficient to combine with the chlorine of the epichlorhydrin. Such glycidyl polyethers are described in U.S. Patent 2,582,985.

Also included are polyepoxypolyhydroxy polyethers obtained by reacting epichlorhydrin or glycerol dichlorhydrin with a mononuclear polyhydric phenol such as resorcinol, hydroquinone, catechol, phloroglucinol, etc. or a polynuclear phenol, such as bisphenol (p,p'-dihydroxydiphenyl dimethyl methane), p,p'-dihydroxyphenone, p,p'-dihydroxydiphenyl, p,p'-dihydroxydibenzyl, o,p,o',p'-tetrahydroxydiphenyl dimethyl methane, hematoxylin, polyhydric anthracenes, polyhydric naphthalenes, etc. Bisphenol is particularly advantageous for use in making these glycidyl polyethers.

Still another group of polymeric glycidyl polyethers which can be used in accordance with this invention results from the reaction, generally in alkaline or acid medium, of a polyhydric alcohol or polyhydric phenol with a glycidyl polyether. Examples of such polyepoxypolyhydroxy polyethers obtained by reacting, preferably in an alkaline or an acid medium, a polyhydric alcohol or polyhydric phenol with a polyepoxide such as the reaction product of gycerol and bis(2,3-epoxypropyl) ether, the reaction product of sorbitol and bis(2,3-epoxy-2-methylpropyl)ether, the reaction production of pentaerythritol and 1,2-epoxy-4,5-epoxypentane, and the reaction product of bisphenol and bis(2,3-epoxy-2-methylpropyl)ether, the reaction product of resorcinol and bis (2,3-epoxypropyl)ether, a similar reaction product using catechol, etc. The process for preparing polyepoxypolyhydroxy polyethers of this group is disclosed in U.S. Patent 2,615,008.

Polyhydric alcohols can be used in the preparation of glycidyl polyethers as well as polyhydric phenols. As set forth in U.S. Patent 2,581,464 these glycidyl polyethers are obtained by reacting, preferably in the presence of an acid-acting compound, such as hydrofluoric acid, one of the aforedescribed halogen-containing epoxides with a polyhydric alcohol, such as glycerol, propylene glycol, ethylene glycol, trimethylene glycol, butylene glycol, and the like, and subsequently treating the resulting product with an alkaline compound.

It has been pointed out that while the invention is not limited to the use of a catalyst, improved cures are sometimes obtained thereby. Generally speaking, any of the known catalysts which are activators for epoxide-carboxyl reactions can be used to increase the rate of cure of the compositions, for example, inorganic and organic bases, e.g., amines, quaternary ammonium hydroxides and alkali metal or alkaline earth metal hydroxides. Included are sodium hydroxide, calcium hydroxide, benzyl dimethyl amine, tributyl amine and dimethylaminomethyl phenol. These alkaline compounds are employed in catalytic quantities, say from 0.01 percent to 5.0 percent.

The polybasic acid anhydrides useful in preparing the resin compositions of this invention contain one or more anhydride groups. Polybasic acid anhydrides applicable to this invention include both aliphatic and aromatic dicarboxylic acid anhydrides, either saturated or unsaturated, for example, succinic, adipic, maleic, tricarballylic, phthalic, pyromellitic anhydrides. Endo - cis - biscyclo-(2,2,1) - 5 - heptene - 2,3 - dicarboxylic anhydride (sold under the trade-mark "Nadic" anhydride), 1,4,5,6,7,7-hexachlorobicyclo - (2,2,1) - 5 - heptene - 2,3 - dicarboxylic anhydride (sold under the trade-mark "Chlorendic" anhydride) are also desirable. Preferred polybasic acid anhydrides are the anhydrides of dicarboxylic acid, preferably phthalic acid anhydride. The acid anhydrides, which are produced by diene syntheses can also be used, for instance, the acid anhydrides which are derived from eleostearic acid-glyceride and maleic acid anhydride, also those of maleic acid anhydride plus terpinene or limonene or other unsaturated hydrocarbons of the terpene series. Other polybasic acid anhydrides within the contemplation of this invention are anhydrides of glutaric, sebacic, isosuccinic, tetrahydrophthalic, naphthalenedicarboxylic, etc.

This invention can perhaps best be illustrated by means of the following examples and table. The examples show, primarily, the preparation of modified resinous compositions of this invention with little emphasis on properties. Properties of resins produced in accordance with the invention are believed best shown by the table following the examples. "Neo Fat 19," used in some of the examples, is essentially a $C_{22}$ fatty acid. It has an acid value of 156 which can also be expressed as a weight per carboxyl group of 360. "Nadic" and "Chlorendic" acid anhydride, employed in some of the examples, have been defined hereinbefore. The examples are, of course, merely illustrative, and it is intended that no undue limitation be read into this invention by reference to the examples.

EXAMPLE 1

Part A

About 1 mol of bisphenol was dissolved in 10 mols of epichlorhydrin and 1 to 2 percent water added to the resulting mixture. The mixture was then brought to 80° C. and 2 mols of sodium hydroxide added in small portions over a period of about 1 hour. During the addition the temperature of the mixture was held at about 90° C. to 110° C. After the sodium hydroxide had been added, the water formed in the reaction and most of the epichlorhydrin was distilled off. The residue was combined with an approximately equal amount of benzene and the mixture filtered to remove the salt. The benzene was then removed to yield a viscous liquid having a weight per epoxide of 185.

Part B 370 grams (1 mol) of the glycidyl polyether of Part A of this example, 152 grams (1.55 mols) of maleic acid anhydride and 128 grams (0.45 mol) of stearic acid were combined and heated with stirring until a clear melt was obtained. The homogeneous mixture was obtained by heating at a temperature of 80° C. to 90° C. When the system was homogeneous, 0.5 percent of dimethylaminomethyl phenol catalyst was added, based on the total combined weights of the reactants. A portion of the melt, about 25 grams, was poured into an aluminum cup. In a closed container, whereby no anhydride would be lost through volatilization, the 25 gram portion of the melt was heated at a temperature of 100° C. for about 1 hour, thereby producing a cured resin.

EXAMPLE 2

As in above Example 1, 370 parts (1 mol) of the glycidyl polyether of Part A of Example 1, 178 grams (1.2 mols) of phthalic acid anhydride and 287 grams (0.8 mol) of "Neo Fat 19" were combined and heated with stirring until a clear melt was obtained. After the melt was obtained, 0.5 percent of dimethylaminomethyl phenol was added as a catalyst, based on the total combined weights of the reactants. In order to cure the resinous melt, about 25 grams of the homogeneous mixture were transferred to a shallow aluminum cup. The cup was heated at a temperature of 125° C. for 1 hour in a closed container, resulting in the production of a cured resin.

EXAMPLE 3

Following Example 1, 10 grams (0.027 mol) of the glycidyl polyether of Part A of Example 1, 4.88 grams (0.033 mol) of phthalic acid anhydride and 3.0 grams (0.021 mol) of 2-ethylhexoic acid were combined and heated in a vessel provided with stirring until a clear melt was obtained. After the melt was obtained, 0.05 gram of dimethylaminomethylphenol was added as a catalyst and a portion of about 25 grams of this homogeneous mixture was cured in a shallow aluminum cup at a temperature of 180° C. for 1 hour. A well cured, hard resin resulted. A similar resin was prepared using 10 grams (0.027 mol) of the glycidyl polyether of Part A of Example 1, 6.96 grams (0.047 mol) of phthalic acid anhydride and 1 gram (0.007 mol) of 2-ethylhexoic acid.

EXAMPLE 4

Part A

In this example the glycidyl polyether of Part A of Example 1 having a weight per epoxide of 185 was used.

Part B

In this example mono-esters were prepared by mixing 1 mol of the glycidyl polyether of Example 1, Part A, 1 mol of a fatty acid and approximately 0.5 percent of sodium hydroxide. As the fatty acid, soya acid, lauric, or oleic was used. The mixture was heated with stirring at 110° C. to 120° C. until an acid value of about 1 was obtained. The time required for this reduction in acid value was approximately 2 hours. The quantities of reactants used to prepare the half-esters and the properties of the half-esters were as follows, viscosity being Gardner-Holdt:

| Glycidyl Polyether, grams | Fatty Acid | | Properties of Half-Ester | | |
|---|---|---|---|---|---|
| | acid | grams | wt./epoxide | viscosity | acid value |
| 209 | soya | 150 | 676 | $Z_1$-$Z_2$ | 1 |
| 266 | lauric | 140.5 | 594 | $Z_5$ | 1 |
| 92.5 | oleic | 70.5 | 675 | Z-1 | 1 |

The above described half-esters were blended with additional quantities of the glycidyl polyether of Example 1, Part A, and cured with phthalic acid anhydride by first heating the mixture until a clear solution was obtained, then adding the dimethylaminomethyl phenol (DMP) catalyst, and then heating the mixture at 180° C. for 1 hour in a sealed container. The quantities of glycidyl polyether, half-ester, phthalic anhydride and catalyst, as well as general properties of the resinous product are as follows:

| Additional Glycidyl Polyether | | Half-Ester | | Phthalic Anh. | | DMP, grams | Properties |
|---|---|---|---|---|---|---|---|
| grams | mols | grams | mols | grams | mols | | |
| 10 | .027 | Soya—10 | .0148 | 10.19 | .069 | .30 | (*) |
| 6 | .016 | Soya—10 | .0148 | 6.99 | .047 | .23 | (*) |
| 2 | .0054 | Soya—10 | .0148 | 3.79 | .0256 | .16 | (*) |
| 10 | .027 | Lauric—10 | .017 | 10.6 | .071 | .30 | (*) |
| 8 | .0216 | Lauric—10 | .017 | 9.0 | .61 | .27 | (*) |
| 6 | .016 | Lauric—10 | .017 | 7.25 | .049 | .23 | (*) |
| 4 | .011 | Lauric—10 | .017 | 5.80 | .039 | .20 | (*) |
| 2 | .0054 | Lauric—10 | .017 | 4.00 | .027 | .16 | (*) |
| 10 | .027 | Oleic—10 | .015 | 10.20 | .069 | .30 | (*) |
| 8 | .0216 | Oleic—10 | .015 | 8.75 | .059 | .27 | (*) |
| 6 | .016 | Oleic—10 | .015 | 6.95 | .047 | .23 | (*) |
| 4 | .011 | Oleic—10 | .015 | 5.50 | .037 | .20 | (*) |
| 2 | .0054 | Oleic—10 | .015 | 3.70 | .025 | .16 | (*) |
| 1 | .003 | Oleic—10 | .015 | 3.10 | .021 | .14 | (*) |

[1] Well cured, tough and flexible.

In carrying out this example it was found also that compositions of this type could be cured by heating at a temperature as low as 80° C. in the absence of a catalyst.

EXAMPLE 5

Part A

About 276 parts (3 mols) of glycerol were mixed with 832 parts (9 mols) of epichlorhydrin. To this reaction mixture were added 10 parts of diethyl ether solution containing about 4.5 percent boron trifluoride, according to U.S. Patent 2,581,464. The temperature of this mixture was between 50° C. and 75° C. for about 3 hours. About 370 parts of the resulting glycerol-epichlorhydrin condensate were dissolved in 900 parts of dioxane containing about 300 parts of sodium aluminate. While agitating, the reaction mixture was heated and refluxed at 93° C. for 9 hours. After cooling to atmospheric temperature, the insoluble material was filtered from the reaction mixture and low boiling substances removed by distillation to a temperature of about 150° C. at 20 mm. pressure. The resulting polyglycidyl ether was a pale yellow, viscous liquid containing between two and three epoxide groups per molecule. It had a weight per epoxide of 155.

Part B 310 grams (2 epoxide equivalents) of the glycidyl polyether of Part A of this example, 229 grams (1.55 mols) of phthalic acid anhydride and 128 grams of linseed oil acids were combined and heated with stirring until a clear melt was obtained. The homogeneous mixture was obtained by heating at a temperature of 100° C. to 110° C. When the system was homogeneous, 0.5 percent of dimethylaminomethyl phenol as a catalyst was added, based on the total combined weights of the reactants. A portion of the melt, about 25 grams, was poured into an aluminum cup. In a closed container, whereby no anhydride would be lost through volatilization, a 25 gram portion of the melt was heated at a temperature of 150° C. for about 1 hour, thereby producing a cured resin.

EXAMPLE 6

As in above Example 3, 310 grams (2 epoxide equivalents) of glycidyl polyether of Part A of Example 3, 178 grams (1.2 mols) of phthalic acid anhydride, and 160 grams (0.8 mol) of lauric acid were combined and heated with stirring until a clear melt was obtained. When the melt was obtained, 0.5 percent of dimethylaminomethyl phenol as a catalyst was added, based on the total combined weights of the reactants. In order to cure the resinous melt, about 25 grams of the homogeneous mixture were transferred to a shallow aluminum cup. The cup was heated at a temperature of 180° C. for 1 hour in a closed container, thereby producing a cured resin.

EXAMPLE 7

Part A

In a flask equipped with a stirrer, condenser, and thermometer were placed 330 grams (3 mols) of resorcinol and 2775 grams (30 mols) of epichlorhydrin in 27 grams of water. To this mixture 250 grams of sodium hydroxide flakes were added slowly in two additions. First 165 grams were added and the flask was slowly heated. When the temperature reached 105° C., heat was withdrawn and the mixture was cooled in a water bath. When the temperature of the mixture decreased to 100° C., an additional 85 grams of sodium hydroxide were added, the mixture being continuously cooled because of the exothermic reaction. After the exotherm subsided, the material was distilled to remove the water. The flask was then cooled, 1000 cc. of benzene added, and the product filtered to remove the sodium chloride. The excess epichlorhydrin and other volatile matter were removed under vacuum. A pale amber, viscous liquid having a weight per epoxide of 143 was obtained.

Part B 286 grams (1 mol) of the glycidyl polyether of Part A of this example, 222 grams (1.5 mols) of phthalic acid anhydride and 179 grams (0.5 mol) of "Neo Fat 19" were combined and heated with stirring until a clear melt was obtained. When the melt was obtained, 0.5 percent of dimethylamino-methyl phenol as a catalyst was added, based on the total combined weights of the reactants. The homogeneous mixture was obtained by heating at a temperature of 100° C. to 110° C. A portion of the melt, about 25 grams, was poured into an aluminum cup. In a closed container, whereby no anhydride would be lost through volatilization, a 25 gram portion of the melt was heated at a temperature of 100° C. for about 1 hour, producing a cured resin.

EXAMPLE 8

As in above Example 7, 10 grams (0.035 mol) of the glycidyl polyether of Part A of Example 7, 8 grams (0.054 mol) of phthalic acid anhydride and 2.8 grams (0.010 mol) of linseed oil acids were combined and heated with stirring until a clear melt was obtained. When the melt was obtained 0.10 gram of dimethylamino-methyl phenol catalyst was added. In order to cure the resinous melt, about 25 grams of this homogeneous mixture were transferred to a shallow aluminum cup. The cup was heated at a temperature of 150° C. for 1 hour in a closed container, thereby producing a cured resin.

EXAMPLE 9

As in above Example 1, 370 grams (1 mol) of the glycidyl polyether of Part A of Example 1, 98 grams (1 mol) of maleic acid anhydride, 81 grams (0.55 mol) of phthalic acid anhydride and 128 grams (0.45 mol) of soya oil acids were combined and heated with stirring until a clear melt was obtained. When the system was homogeneous, 0.5 percent of dimethylaminomethyl phenol as a catalyst was added, based on the total combined weights of the reactants. In order to cure the resinous melt, about 25 grams of the homogeneous mixture were transferred to a shallow aluminum cup. The cup was heated in a closed container at a temperature of 125° C. for 1 hour and at 180° C. for 1 half hour, producing a cured resin.

EXAMPLE 10

As in above Example 1, 370 grams (1 mol) of the glycidyl polyether of Part A of Example 1, 510 grams (1.375 mols) of "Chlorendic" anhydride and 178 grams (0.625 mol) of stearic acid were combined and heated with stirring until a clear melt was obtained. When the system was homogeneous, 0.5 percent of dimethylaminomethyl phenol was added as a catalyst, based on the total combined weights of the reactants. In order to cure the resinous melt, about 25 grams of the homogeneous mixture were transferred to a shallow aluminum cup. The cup was heated at a temperature of 180° C. for 1 hour in a closed container, thereby producing a cured resin.

EXAMPLE 11

As in above Example 1, 10 grams (0.027 mol) of the glycidyl polyether of Part A of Example 1, 6.7 grams (0.044 mol) of "Nadic" acid anhydride and 2.8 grams (0.010 mol) of soybean oil acids were combined and heated with stirring until a clear melt was obtained. After the melt was obtained, 0.10 gram of dimethylaminomethyl phenol catalyst was added. In order to cure the resinous melt, about 25 grams of the homogeneous mixture were transferred to a shallow aluminum cup. The cup was heated at a temperature of 180° C. for 1 hour in a closed container, thus producing a cured, tough resin.

EXAMPLE 12

Part A

Following the procedure set forth in Part A of Example 8 a glycidyl polyether was prepared using p,p'-dihydroxydiphenyl instead of resorcinol, the molar proportions as well as the procedure being the same as in Example 8. The resulting glycidyl polyether was a white crystalline solid having a weight per epoxide of 153.

Part B 306 grams (1 mol) of the glycidyl polyether of Part A of this example, 281.3 grams (1.9 mols) of phthalic acid anhydride, and 20 grams (0.1 mol) of lauric acid were combined and heated with stirring until a clear melt was obtained. When the system was homogeneous, 0.5 percent of dimethylaminomethyl phenol as a catalyst was added, based on the total combined weights of the reactants. A portion of the melt, about 25 grams, was poured into an aluminum cup. In a closed container, whereby no anhydride would be lost through volatilization, a 25 gram portion of the melt was heated at a temperature of 180° C. for about 1 hour, thereby producing a cured resin.

EXAMPLE 13

As in Example 5, 310 grams (1 mol) of the glycidyl polyether of Part A of Example 5, 178 grams (1.2 mols) of phthalic acid anhydride and 160 grams (0.8 mol) of lauric acid were combined and heated with stirring until a clear melt was obtained. In this instance 0.5 percent benzyl dimethylamine was used as a catalyst and was added after the melt was obtained. In order to cure the resinous melt, about 25 grams of the homogeneous mixture were transferred to a shallow aluminum cup. The cup was heated at a temperature of 180° C. for 1 hour in a closed container, thus producing a cured resin.

EXAMPLE 14

Part A

About 536 parts (2.35 mols) of bisphenol and 211 parts (5.17 mols) of sodium hydroxide (10 percent excess) were combined in 1900 parts of water and heated to about 23° C., whereupon 436 parts (4.70 mols) of epichlorhydrin were added rapidly. The temperature was increased and remained at about 90° C. to 100° C. for 1 hour and 40 minutes. The mixture was separated into a 2 phase system and the aqueous layer drawn off. The resinous layer that remained was washed with hot water and then drained and dried at a temperature of about 140° C. The Durrans' Mercury Method melting point of the resulting product was 50° C. and the weight per epoxide was about 325.

Part B 650 grams (1 mol) of the glycidyl polyether of Part A of this example, 281 grams (1.9 mols) of phthalic acid anhydride, and 28.4 grams (0.1 mol) of oleic acid were combined and heated with stirring until a clear melt was obtained. To this homogeneous mixture 0.5 percent benzyl dimethylamine was added as a catalyst. A portion of the melt, about 25 grams, was poured into an aluminum cup. In a closed container, whereby no anhydride would be lost through volatilization, a 25 gram portion of the melt was heated at a temperature of 180° C. for about 1 hour, thereby producing a cured resin.

EXAMPLE 15

Part A

A solution consisting of 11.7 parts of water, 1.22 parts of sodium hydroxide and 13.38 parts of bisphenol was prepared by heating the mixture of ingredients to 70° C. and then cooling to 46° C., at which temperature 14.06 parts of epichlorhydrin were added while agitating the mixture. After 25 minutes had elapsed, there was added during an additional 15 minutes time a solution consisting of 5.62 parts of sodium hydroxide in 11.7 parts of water. This caused the temperature to rise to 63° C. Washing with water at 20° C. to 30° C. temperature was started 30 minutes later and continued for 4½ hours. The product was dried by heating to a final temperature of 140° C. in 80 minutes and cooled rapidly. At room temperature, the product was an extremely viscous semisolid having a melting point of 26° C., by Durrans' Mercury Method and a weight per epoxide of 240.

Part B 18 grams (0.0375 mol) of the glycidyl polyether of Part A of this example, 7.4 grams (0.050 mol) of phthalic acid anhydride and 8.95 grams (0.025 mol) of "Neo Fat 19" were combined and heated with stirring until a clear melt was obtained. To the melt 0.20 gram of dimethylaminomethyl phenol catalyst was added. A portion of the melt, about 25 grams, was poured into an aluminum cup. In a closed container, whereby no anhydride would be lost through volatilization, a 25 gram portion of the melt was heated at a temperature of 180° C. for about 1 hour, thus producing a cured, hard resin.

EXAMPLE 16

Part A

About 744 parts (3.26 mols) of 2,2-bis(4-hydroxyphenyl)propane and 223 parts (5.57 mols) of sodium hydroxide (20 percent excess) were combined in 1900 parts water and heated to about 29° C., whereupon 423 parts (4.5 mols) of epichlorhydrin were added rapidly. The temperature was increased and remained at about 93° C., for 90 minutes. The mixture was separated into a 2 phase system and the aqueous layer drawn off. The resinous layer that remained was washed with hot water and then drained and dried at a temperature of 140° C. The Durrans' Mercury Method melting point of the resulting product was 80° C. and the weight per epoxide was about 586.

Part B 20 grams (0.017 mol) of the glycidyl polyether of Part A of this example, 3.55 grams (0.024 mol) of phthalic acid anhydride and 2.8 grams (0.010 mol) of stearic acid were combined and heated in the presence of 0.15 gram of dimethylaminomethyl phenol catalyst with stirring until a clear melt was obtained. A portion of the melt, about 25 grams, was poured into an aluminum cup, and heated at a temperature of 125° C. for about 8 hours, thereby producing a cured, tough resin without a catalyst.

According to the preceding examples, well cured, resinous compositions can be prepared by this invention. As pointed out, properties of resins of the invention are shown by the following table. For the purposes of illustration, additional examples are used. Hence reactants are listed in the first column of the table. By "Ex. 1, Pt. A" is meant that glycidyl polyether to be modified according to the invention was prepared according to Part A of Example 1, etc. The resins are rated either fair, good or excellent as to toughness, flexibility and impact resistance. In the first column the glycidyl polyether, the polybasic acid anhydride and the fatty acid are given, each resin tested being prepared according to the preceding examples. The Rockwell alpha-hardness test is described in American Standards for Testing Materials. (See ASTM No. D-785-51, Method B.)

Glycidyl Polyether O in the following table was prepared as follows: In a reaction vessel fitted with a stirrer, 4 mols of bis(4-hydroxyphenyl)-2,2-propane (bisphenol) and 5 mols of epichlorhydrin were added to 6.43 mols of sodium hydroxide as a 10 percent aqueous solution. While being stirred, the reaction mixture was gradually heated to about 100° C., during 80 minutes time and was maintained at 100° C. to 104° C. for an additional 60 minutes under reflux. The aqueous layer was decanted and the resin washed with boiling water until neutral to litmus whereupon the resin was drained and dehydrated by heating to about 150° C. The resulting glycidyl polyether had a softening point of 100° C. (Durrans' Mercury Method) and a weight per epoxide of 960.

| Reactants | Mols | Toughness | Flexibility | Impact Resistance | Alpha-Rockwell Hardness |
|---|---|---|---|---|---|
| Ex. 14, Pt. A | 1.0 | Good | Excellent | Good | 74 |
| Lauric Acid | 0.8 | | | | |
| Phthalic Anhydride | 1.2 | | | | |
| Glycidyl Polyether O | 1.0 | Excellent | Good | do | 56 |
| "Neo Fat 19" | 0.45 | | | | |
| Phthalic Anhydride | 1.55 | | | | |
| Ex. 5, Pt. A | 1.0 | Fair | do | do | Soft |
| Stearic Acid | 0.45 | | | | |
| Maleic Anhydride | 1.55 | | | | |
| Ex. 12, Pt. A | 1.0 | Good | Excellent | Excellent | 84 |
| Stearic Acid | 0.275 | | | | |
| "Nadic" Anhydride | 1.725 | | | | |
| Ex. 5, Pt. A | 1.0 | do | Good | Good | 106 |
| "Neo Fat 19" | 0.1 | | | | |
| Phthalic Anhydride | 1.9 | | | | |
| Ex. 1, Pt. A | 1.0 | Excellent | Fair | Excellent | 86 |
| "Neo Fat 19" | 0.1 | | | | |
| Phthalic Anhydride | 1.9 | | | | |
| Ex. 14, Pt. A | 1.0 | do | Excellent | Good | 94 |
| Stearic Acid | 0.1 | | | | |
| Phthalic Anhydride | 1.9 | | | | |

The above examples and table show that resinous products possessing a wide range of desirable properties in the field of plastic materials can be prepared by the reaction of a glycidyl polyether, a polybasic acid anhydride, and a monobasic fatty acid. The process is particularly useful because a wide range of glycidyl polyethers, having epoxides varying from 143 to about 1000, can be used as well as a wide range of higher fatty acids.

In addition to advantages in properties, the incorporation of higher fatty acids into anhydride cured epoxide resins has a distinct economic advantage over the unmodified resins. Not only are the higher fatty acids relatively inexpensive, but when a maximum amount of the higher fatty acid is used, the amount of anhydride which can be used is also greater than when anhydride alone is employed, so that the percent epoxide resin in the final product is considerably smaller than in the resin not so modified.

The new resins which are products of the process of this invention are particularly advantageous for use in the fields of molding, paints, varnishes, potting, and the like, principally for heat hardening plastics, heat hardening varnishes, enamels, and other coatings, electrical insulation, and castings. A particularly important advantage of the invention is that the higher fatty acids function as fluidizing agents. Thus by the addition of the higher fatty acid a viscous glycidyl polyether is made more fluid and, hence, easier to use before curing, for example, during compounding and fabrication stages.

It is understood that other uses and embodiments will occur to those skilled in the art. For example, mixtures of the various reactants can be used, such as mixtures of the higher fatty acids and/or the polybasic acid anhydride. Also, when maleic anhydride is used, a lower bake schedule is desirable. Moreover, when using a high weight per epoxide glycidyl polyether, say, glycidyl polyethers having weights per epoxide around 1000, it is often desirable to melt the glycidyl polyether and fatty acid before the addition of anhydride. Additionally, the resins of this invention can have certain other materials incorporated with them to alter or improve some property, or to make them more easily molded. Among the additional materials which can be so added are fillers such as finely divided wood flour, cotton flock, mica, and asbestos; coloring materials such as pigments; thinners which will enable the formation of thin coatings for protection of such materials as metal; plasticizers to aid in adapting the resins to different uses or to impart to them somewhat different properties; and small amounts of other materials which may hasten curing. Such embodiments may be made without departing from the spirit and scope of this invention.

What is claimed is:

1. A process for preparing a cross-linked, insoluble, infusible resinous composition which comprises reacting at a temperature of 80° C. to 180° C. (a) a glycidyl polyether containing more than one epoxide group per molecule and having a weight per epoxide below 1000, (b) an aliphatic monocarboxylic acid having at least eight carbon atoms, and (c) a polycarboxylic acid anhydride, in a ratio of 2 epoxide equivalents of glycidyl polyether to 0.1 to 0.8 equivalent of monocarboxylic acid to 1.9 to 1.2 equivalents of polycarboxylic acid anhydride wherein the equivalents of monocarboxylic acid plus equivalents of polycarboxylic acid anhydride do not exceed two so that there are no carboxyl groups in excess of epoxide groups and thereby causing, at the temperature employed, carboxyl groups to react preferentially with epoxide groups.

2. The process of claim 1 wherein the glycidyl polyether, higher aliphatic monocarboxylic acid and polybasic acid anhydride are reacted in the presence of a catalyst selected from a group consisting of caustic alkali, tertiary amines and quaternary ammonium hydroxides.

3. The process of claim 1 wherein at least part of the higher aliphatic monocarboxylic acid is reacted with glycidyl polyether prior to addition of polycarboxylic acid anhydride and remaining glycidyl polyether.

4. The process of claim 1 wherein the higher aliphatic monocarboxylic acid is an acid of from 8 to 22 carbon atoms, wherein the glycidyl polyether has a weight per epoxide below 240 and wherein the polycarboxylic acid anhydride is a dicarboxylic acid anhydride.

5. The process of claim 1 wherein the higher aliphatic monocarboxylic acid is an acid of 12 to 18 carbon atoms, wherein the glycidyl polyether comprises substantially the diglycidyl ether of a dihydric phenol having a weight per epoxide of 140 to 200 and wherein the polycarboxylic acid anhydride is phthalic acid anhydride.

6. A cross-linked infusible resinous reaction product resulting from the process of claim 1.

7. A cross-linked infusible resinous reaction product resulting from the process of claim 4.

8. A cross-linked infusible resinous reaction product resulting from the process of claim 5.

References Cited in the file of this patent

UNITED STATES PATENTS

| | | |
|---|---|---|
| 2,324,483 | Castan | July 20, 1943 |
| 2,411,029 | De Groote et al. | Nov. 12, 1946 |
| 2,504,518 | Greenlee | Apr. 18, 1950 |

(Other references on following page)

References Cited in the file of this patent

| | | |
|---|---|---|
| 2,653,141 | Greenlee | Sept. 22, 1953 |
| 2,712,535 | Fisch | July 5, 1955 |
| 2,759,901 | Greenlee | Aug. 21, 1956 |
| 2,768,153 | Shokal | Oct. 23, 1956 |

FOREIGN PATENTS

| | | |
|---|---|---|
| 133,819 | Australia | July 10, 1946 |

OTHER REFERENCES

Epon Resins for Surface Coatings, Tech. Pub. SC: 52–31 (p. 17), 1952.

Schildknecht: "Polymer Processes" ("High Polymers," vol. X), pp. 444–7, Interscience Pub. Inc., N.Y., 1956.